May 31, 1949. R. M. OTIS 2,472,056
FLOW METER
Filed Dec. 11, 1944
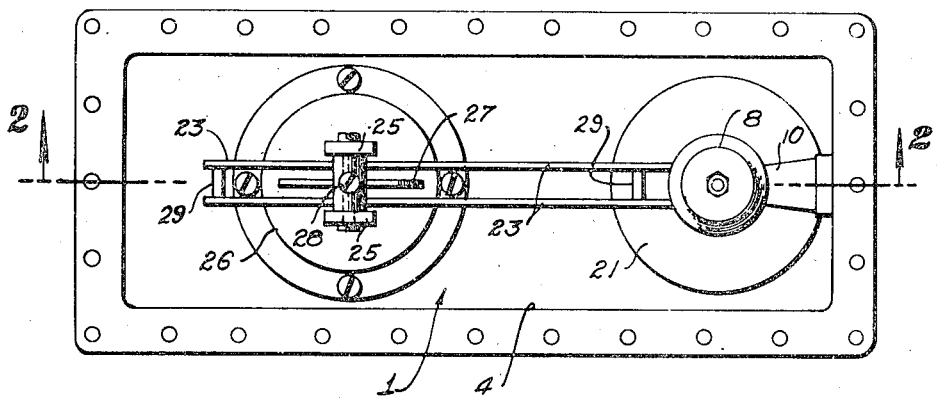
Fig.1.
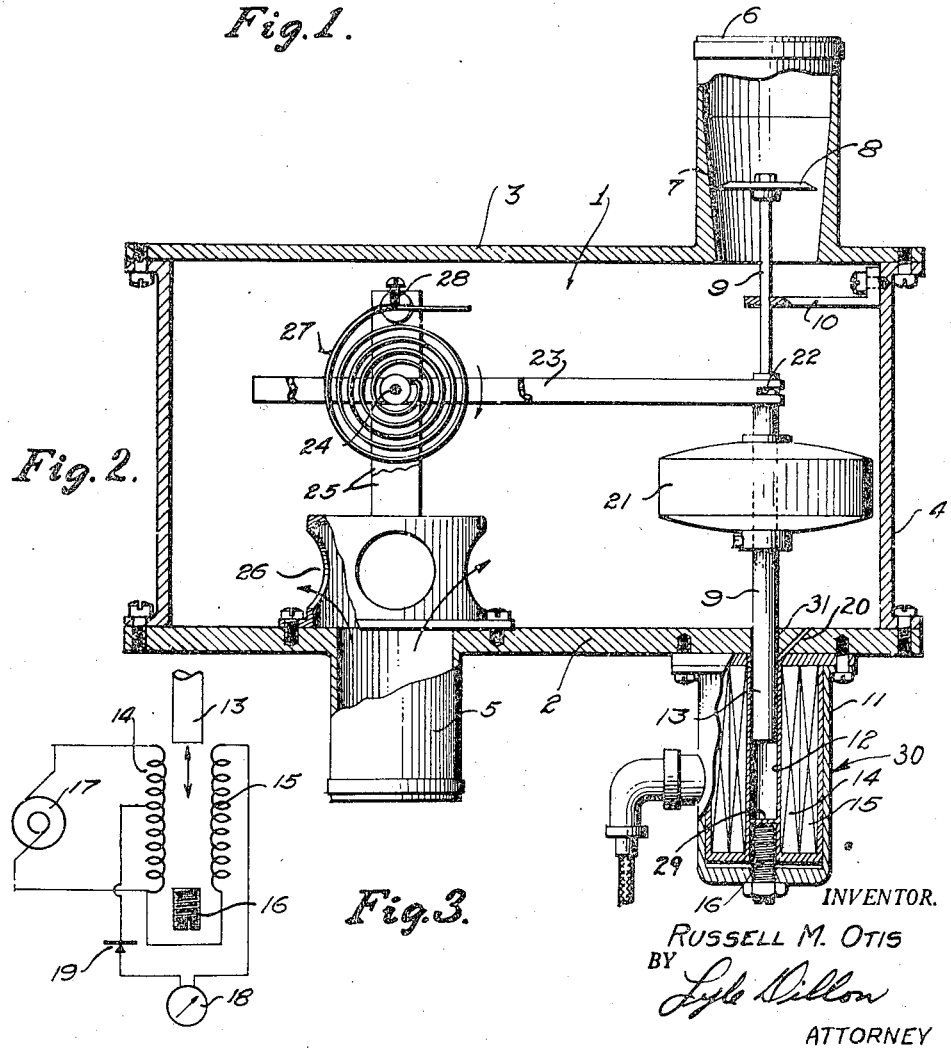
Fig.2.
Fig.3.
INVENTOR.
RUSSELL M. OTIS
BY Lyle Dillon
ATTORNEY Patented May 31, 1949

2,472,056

UNITED STATES PATENT OFFICE 2,472,056

FLOWMETER

Russell M. Otis, Pasadena, Calif., assignor to Lane-Wells Company, Los Angeles, Calif., a corporation of Delaware Application December 11, 1944, Serial No. 567,629

9 Claims. (Cl. 73—209)

My invention relates to flow meters, and among the objects of my invention are:

First, to provide a flow meter designed to measure with a high degree of accuracy the mass of fluid passing through the meter, although the rate of flow may fluctuate over a wide range;

Second, to provide a flow meter, the reading of which is substantially independent of fluid viscosity and which automatically compensates for variations in the density of the fluid being metered, whereby the flow meter measures accurately the flow, in terms of mass for unit time, of fluids which vary appreciably in viscosity and density whether due to changes in temperature or otherwise;

Third, to provide a flow meter which is compact and substantially balanced against acceleration forces in any direction and is, therefore, particularly suitable for installation on aircraft to measure the flow of fluid; and Fourth, to provide a flow meter which permits remote indication so that, for example, the transmitter portion of the meter may be installed in the accessory compartment of an aircraft engine between the fuel pump and carburetor.

With the above and other objects in view, as may appear hereinafter, reference is now directed to the accompanying drawings, in which:

Figure 1 is a plan view of flow meter with the cover removed;

Figure 2 is a sectional view thereof taken along the line 2—2 of Figure 1, with parts in elevation; and Figure 3 is a wiring diagram of the electrical circuit associated with the flow meter for remote indication.

The flow meter is contained within a boxlike housing 1 comprising a bottom plate 2 and a top plate 3 connected by side walls 4. The bottom plate is provided with a centered inlet 5 and the top plate with an outlet 6 located near one end. Within the outlet 6 is formed an outwardly diverging or tapering orifice throat 7. Mounted within the orifice throat 7 is a valve member 8 which is preferably a flat circular disc provided with a sharp beveled edge on the outlet side. The valve member 8 is supported by a stem 9 which centers the disc in the orifice throat. The stem moves vertically in guides 10 and 31 so that the valve member 8 may be raised or lowered in the orifice throat and thereby vary the width of the annulus between the edge of the valve member 8 and the inner adjacent walls of the throat 7.

Suitable means are preferably provided for remotely indicating the position of the stem 9, which is indicative of the rate of fluid flow. For example, electrical means such as shown at 30 may be employed for this purpose.

A transformer shell 11 composed of magnetically permeable material is secured to the underside of the bottom plate 2 in axial alignment with the outlet 6. A socket 12 composed of a suitable non-magnetic material and preferably also a nonconductive material, such as Lucite, is provided, centrally located within the transformer shell. The socket communicates with the interior of the housing 1. The lower end of the stem 9 which is made of a magnetic material such as soft iron slidably extends into the socket 12 and thus constitutes a movable core element 13 of a transformer. The stem 9 preferably fits closely the guide hole 31 in the bottom plate 2 through which it passes, so that the stem 9 is freely slidable in the hole but is accurately guided thereby. However, substantial clearance may be provided between the stem 9 and the inside surface of the socket 12. A hole 20 connects the clearance space of socket 12 with the interior of the housing 1 so that the socket 12 is always filled with fluid. The fit of the stem 9 within the socket 12 and the size of the hole 20 are preferably such as to provide dashpot action when the stem 9 is moved. Within the transformer shell 11 and concentrically surrounding the socket 12 is a primary winding 14 and a secondary winding 15. An adjustment screw 16, composed of magnetic material such as soft iron, extends upwardly from the lower end of the transformer shell in axial alignment with the core 13, but does not extend into the socket 12 which terminates at partition 29 short of the lower end of the transformer shell. The screw 16 forms an auxiliary core which may be adjusted to modify the response of the remote indicating device.

The primary winding 14 is connected to an alternating current source 17 of substantially constant voltage, while the secondary winding is connected to an electric meter 18, preferably a direct current meter, in which case a rectifier 19 is included in the secondary circuit. One end of the secondary is preferably connected to one end of the primary, and the other end of the secondary is connected through the meter 18 and the rectifier 19 to a point on the primary 14 so that the portion of the primary included in the secondary circuit has a voltage which is opposed to the secondary voltage. By properly locating this connection on the primary 14, and by adjustment of the screw 16, the voltage across that portion of the primary which is included in the secondary circuit may be made to balance the secondary voltage, and the meter 18 may be caused to read "zero" when the core 13 occupies some predetermined initial position as, for example, a lower position, this being the position assumed when no fluid is flowing through the flow meter. For a higher position of the core 13, the voltage of that portion of the primary which is included in the secondary circuit is greater than the secondary voltage and a resultant current flows through the meter 18. Thus the reading of the meter 18 is a measure of the position of the core 13 above a predetermined lower starting position.

Attached to the stem 9 within the housing 1 is a relatively voluminous buoyancy member 21, the buoyancy of which tends to raise, and the weight of which tends to lower, the stem 9 and the valve member 8. In using the term "buoyancy" of a member, I mean the force (normally upward) on this member due to its immersion in the fluid, which is equal to the weight of the fluid displaced. Opposing this buoyancy force is the acceleration force (normally downward) on the mass of the member which, in this specification, is considered separately. It will be clear, then, that a "buoyancy member" or "buoyancy means" need not be so light that a resultant upward force is imparted by it when it is immersed in the fluid. The important thing is that the buoyancy in the system, which is affected by the density of the fluid in which it is immersed, shall be sufficient and properly related to the other characteristics of the flow meter, as will hereinafter be described, so that compensation of the whole device for density variation and acceleration may be effected. Above the member 21 the stem 9 is provided with a cross pin 22, the ends of which pivotally and slidably engage a pair of slots formed in the ends of the balance lever beams 23. The balance lever may be formed of two parallel beams spaced apart and connected by cross members 29 and in its intermediate pivotal position it extends horizontally, this being the position shown in Figure 2. The balance lever 23 is supported intermediate its ends by journal pin 24 between posts 25 which extend vertically upward from a cage 26 mounted over the inlet 5. The cage 26 is provided with openings for entrance of fluid into the housing from the beforementioned inlet 5, but serves to minimize channeling of fluid between the inlet and the outlet. Between the two spaced beams which form the balance lever 23 there is wound a spiral spring 27, the inner end of which is anchored to the balance lever and the outer extremity of which is adjustably connected by a tension adjustment screw 28 to the upper extremities of the posts 25. The spring 27 exerts a torque on the lever 23, tending to lower the stem 9 and the attached parts. The spring 27 is preferably made sufficiently long to exert a substantially constant torque throughout the limited travel of the lever 23. A spiral spring arranged and positioned as illustrated at 27, having its mass so distributed as to locate its center of gravity substantially at the center of the spiral and upon the axis of the balance pivot 24, is, in effect, substantially dynamically balanced and may, therefore, be subjected to acceleration without any resultant torsional force components due to such acceleration being applied to the balance lever 23. Obviously, other kinds and arrangements of means may be employed to provide a substantially constant torque on the lever 23, it being only essential that such means be substantially unaffected by gravity or acceleration forces.

The volumes and, therefore, the buoyancies of the various moving parts of the flow meter are preferably just sufficient to balance the masses thereof in their effect on the lever 23 so that, apart from the effect of the spiral spring 27, the lever 23 is in balance when the housing is full of liquid of the design density.

During flow of liquid through the meter and out through the throat 7 a pressure differential is created between the lower and upper sides of the valve member 8, tending to raise the valve member. Since this tendency is opposed only by the downward force due to the downward force of the spring 27, which remains constant, it is clear that, for a fluid of given density, the valve member 8 will tend to move upward until a certain definite pressure differential exists across the valve member just sufficient to exert an upward force on the valve member equal to the downward force due to the spring 27. Thus, in the condition of equilibrium, for a fluid of given density, the valve member is always acted upon by a pressure differential of substantially the same value. For a flow of fluid with higher velocity the same pressure differential upon the valve member can only be obtained with a larger annular orifice opening which corresponds to a higher position of the valve member 8 within the throat 7. It will be evident, therefore, that if the valve member 8 is in such a position that the pressure differential across it is sufficient to overcome the downward force acting through the stem 9 the valve member 8 will rise in the throat 7 in the direction of increasing throat diameter, and as it rises it will open up the width of the annular orifice through which the fluid flows and the pressure differential will correspondingly decrease until finally a condition of equilibrium is attained.

I have discovered that if a certain relationship exists between the effective buoyancy of the movable system, the effective mass of the movable system, the torque of the spring, and the design density of the fluid, it is possible to substantially eliminate the effect of fluid density on the reading of the instrument and the instrument can be calibrated in terms of mass of fluid flowing per unit time. Furthermore, if a certain relationship exists between the effective buoyancy of the movable system, the effective mass of the movable system and the design density of the fluid it is possible to substantially eliminate the effect of acceleration on the reading of the flow meter. The manner of accomplishing these compensations for density change and acceleration change, as well as the general operation of the device, will become more evident from consideration of the following quantitative explanation:

B=effective buoyancy volume of the entire movable system, considered as acting along the axis of the stem 9. This is the volume of a fictitious float whose force of buoyancy acts along the axis of the stem 9, and whose force of buoyancy results in the same torque on the lever 23 as the individual buoyancies of all the parts of the entire movable system. In figuring these buoyancies, one considers only the volumes of fluid displaced by the individual parts and takes into account the lever arms of the various parts, but neglects the masses of the parts because the masses are taken account of in the quantity M.

M = effective mass of the entire movable system, considered as acting along the axis of the stem 9. This is the mass of a fictitious member having its center of gravity on the stem 9 and whose force due to vertical acceleration results in the same torque on the lever 23 as results from the vertical acceleration forces on all the individual parts of the movable system, including those on the opposite side of the fulcrum from the stem 9. In figuring the effective mass M, one takes into account both the masses of the individual parts and their lever arms.

F = effective force of the spring 27 applied along the axis of the stem 9. This is force exerted axially on the stem 9 by the spring, in this case, through the lever 23.

A = area of the valve member 8 (stem 9 neglected).

S = area of the annular orifice between the valve member 8 and throat 7.

$P_1$ = pressure below the valve member 8 (upstream side).

$P_2$ = pressure above the valve member 8 (downstream side).

$h$ = head of fluid corresponding to $(P_1-P_2)$, which =

$$\frac{P_1-P_2}{Da}$$

D = density of the fluid, mass per unit volume, in general.

$D_0$ = design density of the fluid.

C = a constant—is the discharge coefficient of the annular orifice between the valve member 8 and throat 7.

$a$ = total acceleration vertically = $g+\alpha$ where $g$ = acceleration due to gravity and $\alpha$ = acceleration of the apparatus with respect to the earth. The weight of a mass M under these conditions, neglecting buoyancy, is Ma.

V = velocity of fluid in the annular orifice and, according to a well known formula, $=C(2ah)^{\frac{1}{2}}$ Q = volume of fluid per unit of time passing through the flow meter.

W = mass of fluid per unit of time passing through the flow meter.

L = distance of valve member 8 above position corresponding to zero flow.

Then:

The force of fluid on the valve member 8 is $A(P_1-P_2)$.

The force due to buoyancy is BDa.

The force due to the acceleration $a$ is Ma and is opposite in direction to the force of buoyancy and the force of the fluid.

In equilibrium, $$A(P_1-P_2)+BDa-Ma=F \quad (1)$$

Therefore, $$P_1-P_2=\frac{F+Ma-BDa}{A} \quad (2)$$

$$h=\frac{P_1-P_2}{Da}=\frac{F+Ma-BDa}{ADa} \quad (3)$$

$$V=C(2ah)^{\frac{1}{2}}=C\left[\frac{2(P_1-P_2)}{D}\right]^{\frac{1}{2}}=C\left[\frac{2(F+Ma-BDa)}{AD}\right]^{\frac{1}{2}} \quad (4)$$

$$Q=VS \quad (5)$$

$$W=QD=VSD \quad (6)$$

Therefore, $$W=CS\left[\frac{2D(F+Ma-BDa)}{A}\right]^{\frac{1}{2}} \quad (7)$$

S varies with L, and, hence, the valve member will come to an equilibrium height L, in which Equation 7 above is satisfied. If the angle of taper of the throat 7 is small, or if the taper is varied axially such that S is directly proportional to L, then S = KL where K is a constant, and $$W=CKL\left[\frac{2D(F+Ma-BDa)}{A}\right]^{\frac{1}{2}} \quad (8)$$

In Equations 7 and 8 all of the quantities C, K, A, F, M and B are constant, so for a constant fluid density, W is proportional to S in Equation 7 and to L in Equation 8. Thus, a substantially linear indication of rate of flow is obtainable.

If M is made equal to $BD_0$, $Ma=BD_0a$, and $$W=CS\left[\frac{2D_0F}{A}\right]^{\frac{1}{2}}$$

when the density of the fluid is equal to the design density; and under these circumstances the reading of the flow meter is completely independent of the acceleration. For other expected densities of fluid differing from the design density, the effect of acceleration change is minimized when $M=BD_0$. The effect of acceleration is further minimized by the dashpot action of the stem 9 and the socket 12, which effectively prevents all but prolonged accelerations from affecting the instrument, regardless of the density of the fluid.

The condition for compensation for density changes is derived by differentiating with respect to D that part of Equation 7 which depends upon D and equating the derivative to zero.

$$\frac{\partial[D(F+Ma-BDa)]}{\partial D}=F+Ma-2BDa=0$$

and hence $F+Ma=2BD_0a$ for best compensation for density changes around the design density $D_0$. Since this expression depends upon "$a$" and since the most common value of "$a$" existing under observing conditions is "$g$," I prefer to make $F+Mg=2BD_0g$. Then, since for least dependency upon acceleration, I make $M=BD_0$, as heretofore explained, this equation reduces to $$F=BD_0g=Mg \quad (9)$$

When this equation is satisfied in the construction of the flow meter, the reading of the flow meter for a given rate of flow, in mass per unit of time, will not change for small deviations of density of fluid from the design density. As the density of the fluid departs from the design density, $D_0$, a small error will appear which becomes greater for greater departures from the selected design density. These errors are, however, very small for variations in density ordinarily encountered. In designing a flow meter for measurement of gasoline, for example, the design density, $D_0$, is chosen as the average density of the gasoline which is expected and the spring force, the effective buoyancy volume, and the effective mass are made to satisfy Equation 9 above. Then the density may vary either up or down from the design density $D_0$ by, say, 6%, with only an effect on the indicated rate of about 0.1%. Thus, the rate of flow of gasoline in pounds per hour can be measured accurately over a wide range in temperature and composition of the gasoline.

If the construction of the flow meter is such as to satisfy Equation 9 above, there are substantially no primary effects of either acceleration or fluid density. When the fluid density is $D_0$ there is no effect of acceleration variations, and when the acceleration is "$g$," that due to gravity, there is no significant effect of change of density from $D_0$. Thus, the effects due to change of acceleration and of density are only secondary effects, present in small quantity when the other of these parameters is not at its design value. Errors due to acceleration and density change are, in this manner, held to an insignificant minimum.

By reason of the fact that the valve member 8 is thin and provided with a sharp annular beveled edge, changes in viscosity of the fluid do not affect the reading of the instrument. The transformer core 13 moving in the socket 12 constitutes a dashpot which effectively damps out any sudden changes which might tend to cause the meter to provide an unsteady reading. Thus the factors which would otherwise affect the accuracy of the flow meter are either fully compensated for, or sufficiently compensated for, within the intended range of operation, and these features are provided in an instrument which is compact enough for aircraft use and is capable of remote reading. Obviously, other means than that shown may be employed for remotely indicating the position of the valve member.

The terms "effective force" of the spring, "effective buoyancy volume" or "effective mass," as the case may be, are used to indicate the force, buoyancy volume, or mass, which may be considered as acting along the line of movement of the valve member which would produce an effect on the movable system equivalent to the resultant effect produced by the actual force, buoyancy volume, or mass, referred to.

The term "movable system" is employed to denote as a unit all the parts which have movement relative to the housing.

The foregoing is merely illustrative of one typical embodiment of the invention and is not to be limiting. Various modifications and alternative arrangements may be made by those skilled in the art without departing from the spirit and scope of the invention as defined in the appended claims.

I claim:

1. A flow meter comprising: a throat for the flow therethrough of fluid to be metered; a movable system, including a member associated with said throat, and movable throughout a limited range in response to variation in differential pressure between the upstream and downstream sides of said member, both of said sides of said member being located within said throat throughout said range of movement of said member, said movable system having an effective buoyancy volume, the buoyancy of which tends to move said member in the same direction as that tended to be induced by said differential pressure; and means acting on said movable system with a predetermined force component, substantially independent of acceleration, tending to move said member in the opposite direction to that induced by said differential pressure, the sum of the effective force of said means and the force of gravity on the effective mass of said movable system being substantially equal and opposite to twice the force of buoyancy on said effective buoyancy volume when said system is immersed in fluid of the same density as the fluid to be metered and when the acceleration on said system and on said fluid is only that due to gravity.

2. A flow meter comprising: a housing having an inlet and an outlet opening for the flow therethrough of fluid to be metered, one of said openings forming a tapered throat; a movable system in said housing, including a member substantially wholly disposed in said throat, movable axially therein, and defining therewith an orifice of variable area, and said movable system having an effective buoyancy volume, the buoyancy of which tends to move said member in the direction of greater throat area; and means acting on said movable system with a predetermined force component, substantially independent of acceleration, to oppose the force on said member due to fluid pressure differential resulting from fluid flowing through said orifice, the sum of the effective force of said means and the force of gravity on the effective mass of said movable system being substantially equal and opposite to twice the force of buoyancy on said effective buoyancy volume when said system is immersed in fluid of the same density as the fluid to be metered and when the acceleration on said system and on said fluid is only that due to gravity.

3. A flow meter comprising: a housing having an inlet and an outlet opening for the flow therethrough of fluid to be metered, one of said openings forming a tapered throat; a movable system in said housing, including a member substantially wholly disposed in said throat, movable axially therein, and defining therewith an annular orifice of variable area, and said movable system having an effective buoyancy volume, the buoyancy of which tends to move said member in the direction of greater throat area; and resilient means acting on said movable system with predetermined force to oppose the force on said member due to fluid pressure differential resulting from fluid flowing through said orifice, the sum of the effective force of said means and the force of gravity on the effective mass of said movable system being substantially equal and opposite to twice the force of buoyancy on said effective buoyancy volume when said system is immersed in fluid of the same density as the fluid to be metered and when the acceleration on said system and on said fluid is only that due to gravity.

4. A flow meter comprising: a housing having an inlet and an outlet opening for the flow therethrough of fluid to be metered, one of said openings forming a tapered throat; a movable system in said housing, including a member substantially wholly disposed in said throat, movable axially therein, and defining therewith an orifice of variable area, and said movable system having an effective buoyancy volume, the buoyancy of which tends to move said member in the direction of greater throat area; means acting on said movable system with a predetermined, effective force component, substantially independent of acceleration, to oppose the force on said member due to fluid pressure differential resulting from fluid flowing through said orifice, the effective force of said means being substantially equal in magnitude and direction to the force of gravity on the effective mass of said movable system, and substantially equal in magnitude but opposite in direction to the force of buoyancy on said effective buoyancy volume when said system is immersed in fluid of the same density as the fluid to be metered and when the acceleration is only that due to gravity.

5. A flow meter comprising: a housing having an inlet and an outlet opening for the flow therethrough of fluid to be metered, one of said openings forming a tapered throat; a movable system in said housing, including a member substantially wholly disposed in said throat, movable axially therein and defining therewith an annular orifice of variable area, and said movable system having an effective buoyancy volume, the buoyancy of which tends to move said member in the direction of greater throat area; and resilient means acting on said movable system with predetermined force to oppose the force on said member due to fluid pressure differential resulting from fluid flowing through said orifice, the effective force of said means being substantially equal in magnitude and direction to the force of gravity on the effective mass of said movable system, and substantially equal in magnitude but opposite in direction to the force of buoyancy on said effective buoyancy volume when said system is immersed in fluid of the same density as the fluid to be metered and when the acceleration is only that due to gravity.

6. A flow meter comprising: a housing having an inlet and an outlet opening for the flow therethrough of fluid to be metered, one of said openings forming a tapered throat; a movable system within said housing including a member substantially wholly disposed in said tapered throat, movable axially therein, and defining therewith an orifice of variable area, said movable system having a substantially constant effective buoyancy volume under all flow rates, the buoyancy of which tends to move said member in the direction of greater throat area, and said movable system having an effective mass substantially equal to the product of said effective buoyancy volume and the density of the fluid to be metered; and means at least partially included in said movable system to apply a force independent of acceleration to oppose the force of buoyancy of said movable system and the force on said member due to fluid pressure differential resulting from fluid flowing through said orifice.

7. A flow meter comprising: a throat for the flow therethrough of fluid to be metered; a container in communication with said throat; a movable system including a member associated with said throat and movable longitudinally therein throughout a limited range in response to variation in differential pressure between the upstream and downstream sides of said member, both of said sides of said member being located within said throat throughout said range of movement of said member; a float body included in said movable system, located exterior to said throat, in said container, said movable system including said float body having an effective buoyancy volume the buoyancy of which tends to move said member in the same direction within said throat as that tended to be induced by said differential pressure, and the force due to the effective buoyancy of which approximately balances the force due to the effective mass of said movable system when said movable system is submerged in fluid of the same density as the fluid being metered through said throat; and resilient means acting on said movable system throughout said range of motion with a force component tending to move said member in the opposite direction to that tended to be induced by said differential pressure.

8. A flow meter comprising: a throat for the flow therethrough of fluid to be metered; a container in communication with said throat; a movable system including a member associated with said throat and movable longitudinally therein throughout a limited range in response to variation and differential pressure between the upstream and downstream sides of said member, both of said sides of said member being located within said throat throughout said range of movement of said member; a float body included in said movable system, located exterior to said throat, in said container, said movable system including said float body having an effective buoyancy volume the buoyancy of which tends to move said member in the same direction within said throat as that tended to be induced by said differential pressure, and the force due to the effective buoyancy of which approximately balances the force due to the effective mass of said movable system when said movable system is submerged in fluid in the same density as the fluid being metered through said throat; and resilient means acting on said movable system throughout said range of motion with a substantially constant force component tending to move said member in the opposite direction to that tended to be induced by said differential pressure.

9. A flow meter according to claim 6 in which substantially all of said movable system except said member is located within said housing, outside of said throat and thereby adapted to be submerged in the same, relatively quiescent fluid as that flowing through said throat to be metered.

RUSSELL M. OTIS.

REFERENCES CITED

The following references are of record in the file of this patent:

UNITED STATES PATENTS

| Number | Name | Date |
|---|---|---|
| 830,338 | Ledoux | Sept. 4, 1906 |
| 1,567,940 | Gramberg | Dec. 29, 1925 |
| 1,641,744 | Decker | Sept. 6, 1927 |
| 1,917,974 | Inglis et al. | July 11, 1933 |

FOREIGN PATENTS

| Number | Country | Date |
|---|---|---|
| 378,726 | Germany | July 30, 1923 |
| 594,182 | Germany | Mar. 13, 1934 |
| 408,605 | Great Britain | Apr. 9, 1934 |
| 776,172 | France | Oct. 31, 1934 |

OTHER REFERENCES

An article entitled "New Rotameter Types," on page 296, vol. 11 of Instruments, Dec. 1938, a magazine published by the Instrument Publishing Co., 1117 Wolfendale Street, Pittsburgh, Pa.